United States Patent [19]
Hershberg

[11] 4,148,060
[45] Apr. 3, 1979

[54] APPARATUS FOR DISTRIBUTING TELEVISION SIGNAL WITH STEREOPHONIC AUDIO VIA SATELLITE

[75] Inventor: David E. Hershberg, East Setauket, N.Y.

[73] Assignee: Satellite Transmission Systems, Inc., Hauppauge, N.Y.

[21] Appl. No.: 759,374

[22] Filed: Jan. 14, 1977

[51] Int. Cl.² .................. H04N 7/00; H04N 7/04
[52] U.S. Cl. .................................... 358/83; 358/144
[58] Field of Search .............. 358/1, 12, 86, 144, 358/83; 179/15 BT; 325/36, 4, 308

[56] References Cited

U.S. PATENT DOCUMENTS

| | | | |
|---|---|---|---|
| 3,046,329 | 7/1962 | Reesor | 179/15 BT X |
| 3,264,414 | 8/1966 | Santilli et al. | 179/15 BT |
| 3,497,628 | 2/1970 | Dias | 179/15 BT |
| 3,860,873 | 1/1975 | Ringstad | 325/308 |

OTHER PUBLICATIONS

"The First Nationwide Live Stereo Simulcast Network", SMPTE Journal, vol. 86, Jan. 1977, pp. 9-12.

*Primary Examiner*—Robert L. Griffin
*Assistant Examiner*—Aristotelis M. Psitos
*Attorney, Agent, or Firm*—Stephen B. Judlowe

[57] ABSTRACT

A system for distributing a television program with stereophonic audio via satellite includes a video base band, and audio left and right signals each frequency modulating spaced subcarriers. Special low level tone pulses are transmitted via the respective subcarriers when a television program with stereophonic audio begins and when it ends.

Those receiving stations wishing to distribute stereo audio (as via cooperating local television and FM stations) merely detect and disseminate each subcarrier modulation. Receiving stations desirous of distributing monaural audio recognize the stereo program signalling pilot, and enable a left and right program summing amplifier to restore and furnish a compatable, full monaural audio signal.

4 Claims, 3 Drawing Figures

APPARATUS FOR DISTRIBUTING TELEVISION SIGNAL WITH STEREOPHONIC AUDIO VIA SATELLITE

This invention relates to satellite communications and, more specifically, to the distribution of a television program with stereophonic audio while automatically providing monophonic compatability for receiving stations servicing areas not equipped for stereo or otherwise not desirous of effecting stereophonic signal distribution.

It is an object of the present invention to provide improved television signal distribution via satellite.

More specifically, it is an object of the present invention to provide apparatus and a system arrangement of distributing a television program with stereophonic audio via satellite while permitting monophonic compatability at selected receiving stations under local option which is not affected by intersubcarrier channel phase delays inherent in satellite signal radiation rendering left and right audio sum and differencing matrixing undesirable; and which does not needlessly interject transmission noise from an open subcarrier audio channel during periods of monaural transmission.

The above and other objects of the present invention are realized in a specific illustrative stereophonic audio television signal distribution system which is propagated via satellite. The radiated signal ensemble includes base band video, and frequency multiplexed subcarriers respectively frequency modulated with left (or monaural) and right audio, and with low level "begin" and "end" of stereo program pilot signal tone bursts.

At receiver locations distributing stereo, the audio programs are stripped off the main and subcarriers, and separately disseminated — as via cooperating local TV and FM stations; via CATV cable, or the like. Receiving stations distributing only monaural audio only respond automatically to monaural audio when transmitted, and to the "begin" and "end" stereo program subcarrier pilots by operatively enabling and disabling left and right audio signal summing apparatus to reconstruct monaural audio during periods of stereophonic transmission.

The above and other features and advantages of the present invention will become more readily apparent from the following specific, illustrative stereo television signal distribution system, described in detail hereinbelow in conjunction with the accompanying drawing, in which.

Figure 1:
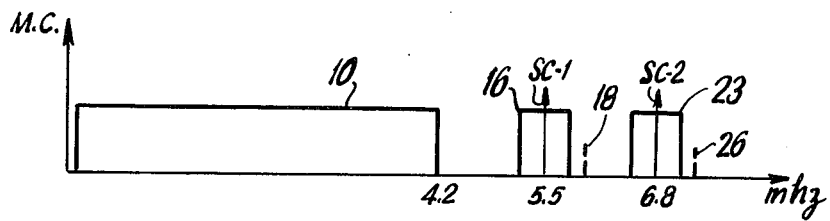
FIG. 1 depicts a base band spectrum (for main carrier modulation) for the video and audio signals forming a composite stereo television program.

Referring now to FIG. 1 there is shown at base band a frequency spectrum for the video and audio components forming one television program employed at a transmitter to modulate a main carrier, e.g., by frequency modulation for the assumed FM-FM multiplexing-modulation system employed in the specifically disclosed embodiment of the instant invention. The composite television signal ensemble includes an approximately 4.2 Mhz wide standard video signal 10. A first subcarrier SC-1 (e.g., at 5.5 Mhz) modulated either by the composite monaural audio during monophonic transmission and, during stereophonic transmission, by one of the stereo audio signals, e.g., the left signal, occupies an intermediate frequency spectrum 16. Similarly, the other or "right" (for the assumed case) audio program accompanies an upper frequency band 23 developed by frequency modulating a second, e.g., 6.8 Mhz subcarrier SC-2.

The frequency modulation deviations alloted for the subcarriers SC-1 and SC-2 modulations may be of any convenient values consistent with the signal to noise ratio desired for the audio program, typical values being approximately ± 0.8 Mhz for the lower subcarrier SC-1 and approximately ± 1.0 for the upper subcarrier SC-2. With such a modulation arrangement, the video signal is not significantly degraded.

Also included in the FIG. 1 signal ensemble are superaudible control tones 18 and 26 selectively employed for purposes below discussed, and which, when present, also frequency modulate the respective subcarriers SC-1 and SC-2. Control tones 18 and 26 may, for example, be of a frequency 20 Khz, and be of a fairly low amplitude and thus deviation level. The tones 18 and 26 are employed to signal receiver equipment when a stereo program begins (e.g., burst of tone 18) and when a stereo program ends (burst of tone 26).

Figure 2:
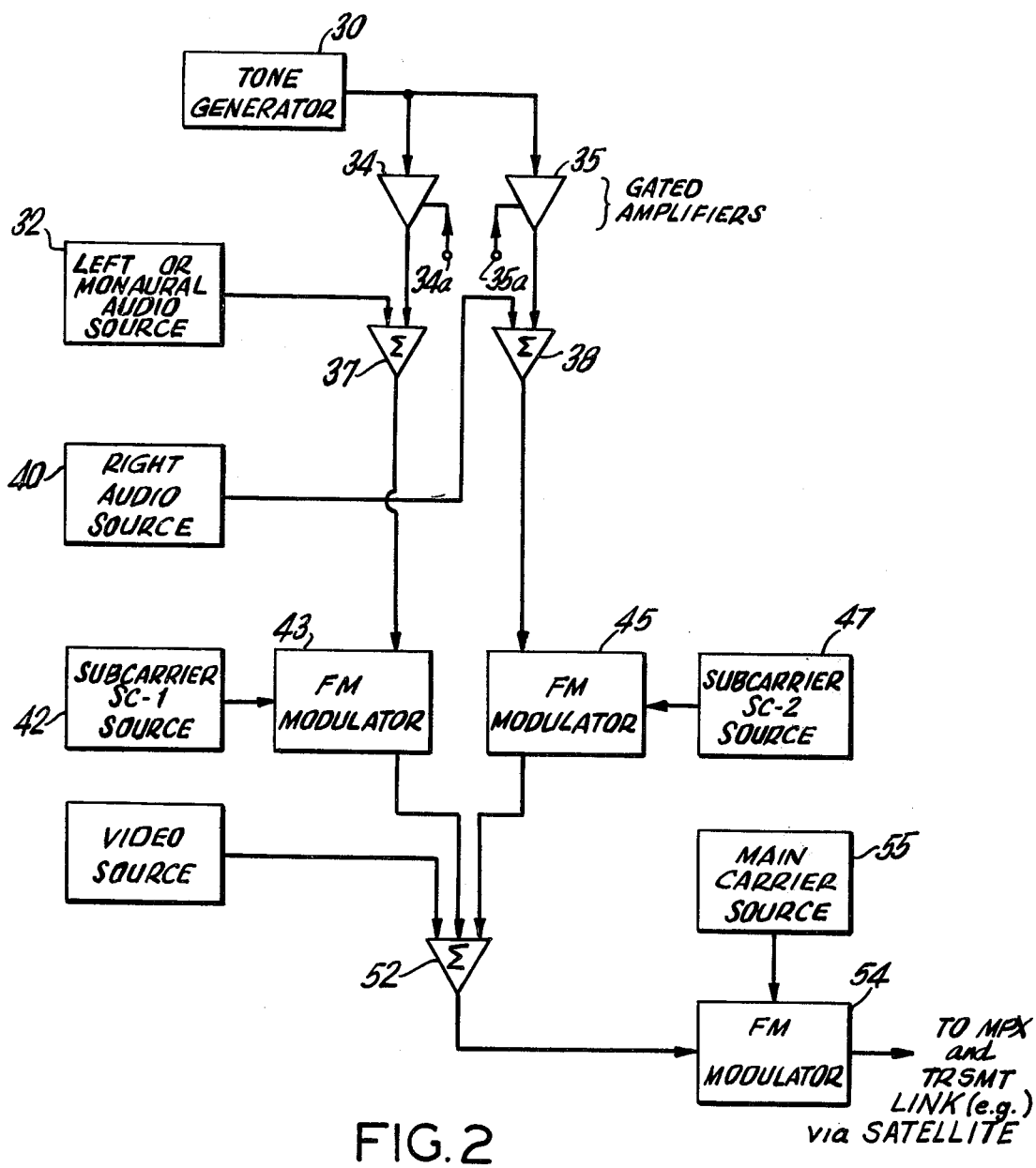
FIG. 2 is a block diagram illustrating signal generation equipment employed at a transmitting station.

A circuit arrangement for generating a stereo television program for satellite transmission in accordance with the FIG. 1 modulation pattern is shown in FIG. 2. The arrangement includes linear combining networks 37 and 38 (e.g., resistive latices, operational amplifiers as shown, or the like) which sum the television program left and right audio signals, respectively supplied by sources 32 and 40 thereof, with the tones 18 and 26, if present, supplied at the output of gated amplifiers 34 and 35. The superaudible tones 16 and 18 may be of the same or different frequencies, and are shown emanating from a common generator 30. The gated amplifiers 34 and 35 are controlled at ports 34a and 35a by enabling pulses supplied thereto either manually or automatically at the beginning and end of a stereophonic audio program.

The left audio and tone 18, if present are modulated onto the subcarrier SC-1 furnished by a source 42 in a modulator 43, while a modulator 45 operates on the sometimes present audio and tone output of summing element 38 and subcarrier SC-2 source 47 to provide the upper subcarrier modulation band 23 (FIG. 1). The video, left (or monaural) audio and right audio modulation products 10, 16 and 23, together with such tones 18 or 26 as may be present, are linearly combined in a summing element 52 and modulated on to a main carrier supplied by source 55 in a modulator 54. The output of the modulator 54 is then transmitted to all intended receiving stations via satellite-repeating transmission, as by conventional multiplexers and ground station transmission equipment. When a monaural television signal is being processed, it is simply supplied by source 32 (neither tone 18 or 26 being utilized) and modulated onto one subcarrier, i.e., the subcarrier SC-1 for the assumed organization.

Figure 3:
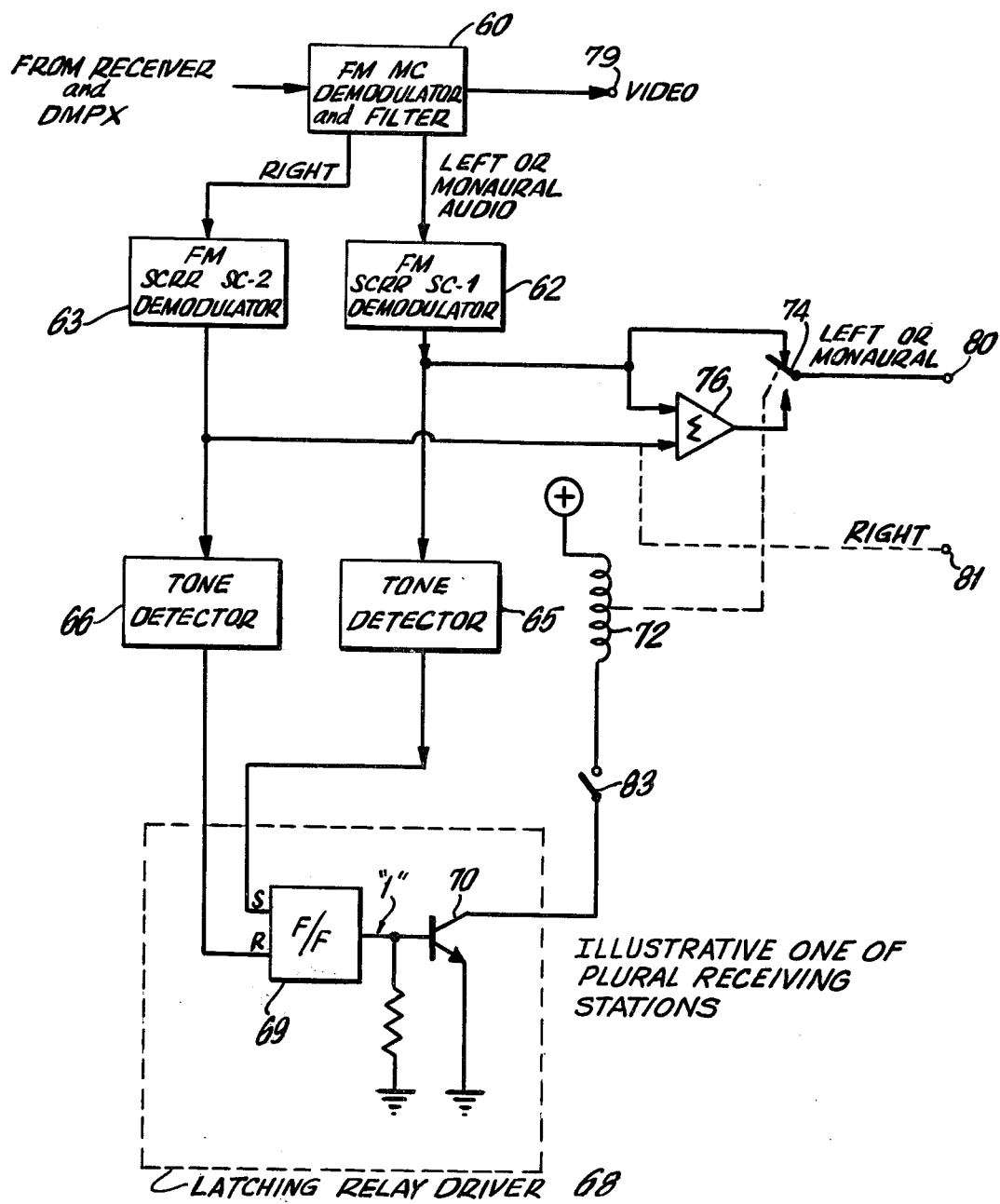
FIG. 3 is a schematic diagram depicting receiver apparatus for reconstructing the base band video and audio television program component.

FIG. 3 depicts the circuit elements at receiving stations for receiving the signal shown in FIG. 1, as transmitted by the equipment considered hereinabove with respect to FIG. 2. In particular, the full ensemble of equipment shown in FIG. 3 is for a receiving station having an option (closed switch 83) to provide a base band television signal comprising a video portion and an audio portion which is a fully compatible monaural signal whether or not the transmitted signal was monaural or stereo. Such receiving stations are sometimes required, as where the local facilities serviced by the receiver are not capable of disseminating stereo signals to viewer locations.

When a television signal is being transmitted with only monaural audio, i.e., where only the subcarrier SC-1 modulated with the full but singular audio program is employed, the incoming signal is received from the satellite, processed by head end demultiplexer structure if multiple diverse channels are employed, and processed by a demodulator and filter 60 which demodulates, recovers and separates the base band and frequency modulations on the incoming main carrier. Through filtering in the element 60, the video base band information is directly available as via a base band low pass filter (output port 79), and the monaural audio program is recovered by the subcarrier SC-1 FM demodulator 62 which then presents at its output the full audio signal. This audio program at the output of the demodulator 62 is then simply coupled to a receiver audio output port 80 via a switch 74 which normally resides in its uppermost position shown in the drawing. Thus, for monaural transmission, the satellite transmission-distribution system presents television video and monaural audio at output ports 79 and 80. These standard television program components are thus available for distribution in normal fashion, as by local preparation of the standard FCC prescribed television wave form for distribution over the air, via cable, or the like.

When a stereo signal is being processed, the FM main carrier demodulator and filter 60 presents the base band video information at output port 79, and supplies the left and right modulated subcarriers SC-1 and SC-2 to the FM subcarrier demodulators 62 and 63. The left and right audio signals, with tone signals 18 and 26 if present, are thus recovered by the circuit elements 62 and 63.

At the beginning of a stereo program, the pilot tone 18 present at the output of demodulator 62 is detected by a tone detector 65, and employed to set a flip flop 69. This generates a relatively high voltage at the "1" output of the flip flop 69, thereby turning on a semiconductor switch 70 and energizing a relay 72. The relay transfer member 74 thereby switches responsive to the activated coil 72 to its lower position shown in the drawing such that the audio output port 80 at the monaural receiving station shown in FIG. 3 is now connected to the output of a summing amplifier 76, rather than directly to the output of the demodulator 62. This position for the switch transfer member 74 persists in a latching mode for the full stereo program, i.e. until the tone 26 is generated at the conclusion of the program, and is detected by the tone detector 66 at the output of demodulator 63 and functions to reset the flip flop, thereby disabling the relay winding and contact 72, 74.

With the switch 74 in its above described position engaging the output of the amplifier 76, a signal is presented to audio output port 80 which corresponds to the sum of the left signal present at the output of the demodulator 62 and the right signal present at the output of demodulator 63. That is, the left and right signals are linearly combined in the amplifier 76 (or alternatively, in any other linear combining network, e.g., a simple resistive network) and forms a blend of left and right audio. A fully compatible audio program is thus delivered to those viewing the composite television program present at the video and audio ports 79 and 80 via the prevailing television program delivery medium. The full receiver apparatus depicted in FIG. 3 and considered above has thus been shown to automatically deliver a full monaural audio program at an output port 80 irrespective of whether the received television program had monaural or stereo audio. Moreover, by disconnecting the summing amplifier 76 during periods of monophonic transmission, noise present at the output of demodulation 63 (which at such time is devoid of signal) is not coupled to the audio output port 80.

For those stations having the capability of locally distributing the television program with stereophonic audio, the left audio program output port 80 and a right audio program port 81, shown dashed in the drawing, are simply fixedly connected to the outputs of the demodulators 62 and 63. When stereo is being distributed, left and right audio signals are present at the ports 80 and 81. Correspondingly, when an incoming manaural television signal is being processed, the port 81 is simply ignored and the monaural signal, present on the left transmission channel via subcarrier SC-1, distributed via the port 80.

The above described arrangement is merely illustrative of the principles of the present invention. Numerous modifications and adaptations thereof will be readily apparent to those skilled in the art without departing from the spirit and scope of the present invention. Thus, for example, the apparatus of the present invention is obviously applicable as well to the distribution of television with stereophonic audio via microwave carrier where non-linearities, inter-channel relative phase delays, and the like defeat conventional sum and difference matrixed audio.

What is claimed is:

1. In combination in a system for distributing a mixture of television programs with monaural audio and television programs with stereophonic audio comprising a video and left and right audio signals, via an electromagnetic communications link, means for supplying a video signal and an audio signal comprising at varying times one of a monaural signal, and left and right stereophonic audio signals, signal generator means including means for generating a main carrier modulated on a frequency division multiplexed basis with said video signal and with first and second subcarriers each modulated with a different one of said left and right audio signals when a television program with stereophonic audio is being processed, means for modulating said first subcarrier with the monaural audio when a monaural television signal is being processed, means for further modulating at least one of said subcarriers with a characteristic signal identifying the incidence of a stereophonic transmission, and at least one first receiving means for receiving television programs originated by said signal generating means via said electromagnetic transmission, each of said first receiving means comprising means for demodulating said first and second subcarriers, an audio output port, means connected to said demodulating means for summing the first and second subcarrier modulation outputs of said demodulating means, controlled switching means for connecting said audio output port with the first subcarrier modulation output of said demodulating means and to the output of said summing means, and characteristic detector means connected to said demodulating means and responsive to the incidence of said characteristic signal for controlling said switching means to connect said audio output port to the output of said summing means.

2. A combination as in claim 1 wherein said characteristic signal comprises a first frequency burst transmitted on one of said subcarriers at the beginning of a stereophonic television program transmission and a second frequency burst transmitted on one of said subcarriers signalling the end of said stereophonic program, said detector means including bistable means, first and second burst detector connected to said demodulating means and responsive to the incidence of said first and second frequency bursts for respectively setting said bistable means to a different, associated one of its stable states.

3. A combination as in claim 1 further comprising at least one second receiving means, for receiving television programs originated by said signal generating means via satellite transmission, each of said second receiving means including first and second audio output ports, and demodulator means connected to said first and second audio output ports for supplying thereto the audio modulations on said first and second subcarriers.

4. A combination as in claim 3 further comprising a communications satellite implementing said electromagnetic communications link for connecting said signal generator means with said first and second receiving means.

* * * * *